United States Patent [19]

McCracken

[11] 3,957,251
[45] May 18, 1976

[54] GATE BARRIER

[76] Inventor: Lester C. McCracken, 28247 203rd Ave. SE., Kent, Wash. 98031

[22] Filed: Aug. 8, 1974

[21] Appl. No.: 493,437

[52] U.S. Cl. .................................. 256/47; 160/223
[51] Int. Cl.² .................................... B21F 27/00
[58] Field of Search ............ 256/47; 160/223, 224, 160/225

[56] References Cited
UNITED STATES PATENTS

| | | | |
|---|---|---|---|
| 234,344 | 11/1880 | Stratton et al. | 160/224 |
| 498,574 | 5/1893 | Ryan | 160/224 |
| 2,511,372 | 6/1950 | Price | 160/224 |
| 3,165,144 | 1/1965 | Kirby | 160/223 |
| 3,489,201 | 1/1970 | Gurry et al. | 160/225 |

*Primary Examiner*—Paul R. Gilliam
*Assistant Examiner*—Doris L. Troutman
*Attorney, Agent, or Firm*—Charles L. Kraft, II; John W. Kraft

[57] ABSTRACT

The barrier comprises a pair of panel sections including a rectangular framework, the panel sections being selectively locked in a straight, linear configuration by a dagger selectively extensible through apertures in the end members and through aligned panel sections; extensible sections each having a pair of rials which may slidably telescope within the rectilinear members at their ends opposite the hinge, means selectively locking the extensible sections with the panel sections, carried on rectilinear members and rails thereof; and abutment bars fastened at the outermost terminal ends of the rails.

8 Claims, 5 Drawing Figures

GATE BARRIER

FIELD OF INVENTION

The present invention relates to barriers and packing and dray equipment, and more particularly to a selectively extensible barrier.

BACKGROUND OF THE INVENTION

The present invention relates to an extensible barrier for retaining material or cargoes in an enclosure. The present invention is particularly adapted to retaining cargoes such as boxes, in enclosures, such as trucks or train cars. The present barrier is also particularly adapted to be completely demountable from the enclosure.

Accordingly, it is an object of the present invention to provide a foldable, selectively extensible, and high-strength barrier for installation between walls of an enclosure.

It is another object of this invention that the barrier be adaptable to various configurations of enclosure walls, including straight enclosure walls and curved enclosure walls.

It is an object of this invention to provide means for locking extensible sections to primary panel sections which may have high reliability and are easily manipulated.

These and other objects shall become apparent from the description following, it being understood that modifications may be made without affecting the teachings of the invention here set out.

SUMMARY OF THE INVENTION

The barrier comprises a pair of panel sections including a rectangular framework, the panel sections being selectively locked in a straight, linear configuration by a dagger selectively extensible through apertures in the end members and through aligned panel sections; extensible sections each having a pair of rails which may slidably telescope within the rectilinear members at their ends opposite the hinge, means selectively locking the extensible sections with the panel sections, carried on rectilinear members and rails thereof; and abutment bars fastened at the outermost terminal ends of the rails.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
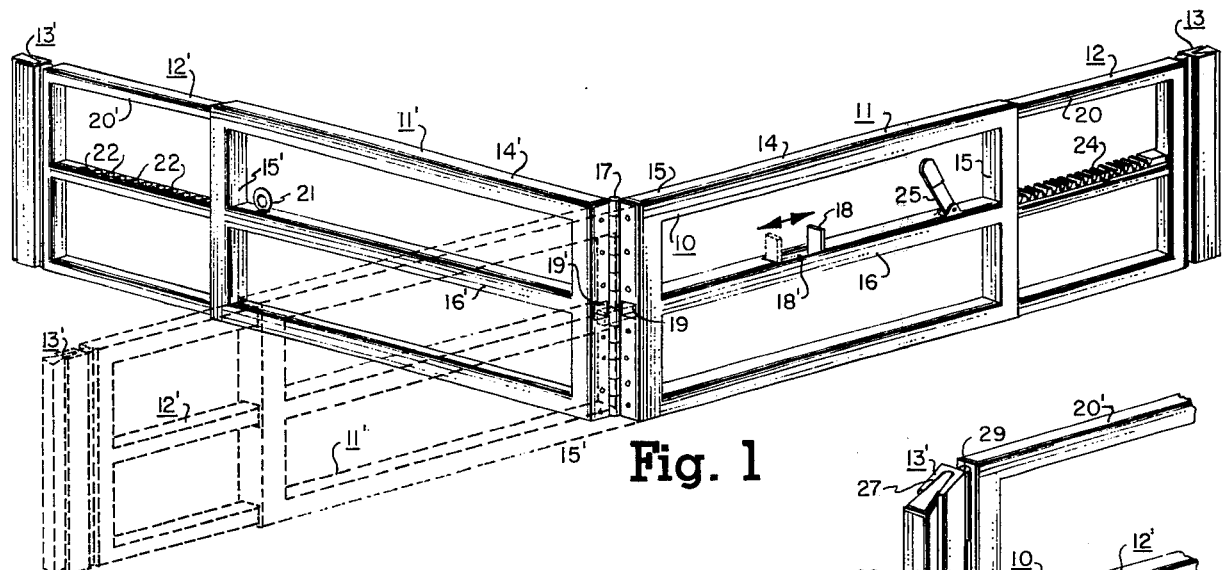
FIG. 1 is a perspective view of a partially folded and partially extended barrier of this invention, being shown with its panel portions fully open in broken lines for illustrative purposes.

Referring now to the drawings and more particularly to the FIG. 1, the barrier of this invention is shown to advantage and generally identified by the numeral 10. The barrier 10 comprises a pair of tubular panel sections 11 and 11', extendable sections 12 and 12' slidably engageable within the sections 11 and 11', respectively, and abutment bars 13 and 13' mounted at the outer ends of the sections 12 and 12', respectively. While a hollow square tube is shown and described herein, other materials and sections may be employed to similar effect.

Each of the sections 11 and 11' comprises a rectangular framework having a pair of parallelly disposed rectilinear tube members 14 and 14', a pair of parallelly transversely disposed members 15 and 15' connecting the ends of the members 14 and 14', and a central rectilinear member 16 and 16' disposed parallel between the members 14 and 14' connected to the end members 15 and 15'. The sections 11 and 11' are joined at end members 15 and 15' by a hinge 17. The sections 11 and 11' are locked into a straight configuration by a dagger 18. The dagger 18 is an L-shaped member having its longer portion slidably carried within one of the central members 16, with its shorter, handle portion issuing through an aperture 18' at the uppermost side of the member 16 carrying the dagger 18. The longer portion of the dagger 18 is selectively extensible through apertures 19 and 19' which are in adjacent registry with the members 16 and 16' in the hinged end members 15 and 15'. It may be seen that it is to advantage to dispose the handle portion of the dagger 18 parallel with the end members 15 and 15' such that the handle portion will not protrude sidewardly. In operation, the sections 11 and 11' may be rotated from a folded position wherein they are parallel and adjacent one another to a straight, open position (as shown by the vector lines in FIG. 1), and are locked by engaging the dagger 18 through the apertures 19 and 19'. It may be seen that a spring (not shown) may be mounted in the member 16 to insure that the dagger 18 remains in engagement.

Each of the extendable sections 12 and 12' comprises a plurality of rails 20 and 20' which slidably telescope within the rectilinear tube members 14 and 14' and the central member 16 and 16', respectively. The outer terminal ends of the rails 20 and 20' are pivotally fastened to the abutment bars 13 and 13' of each of the sections 12 and 12'. Similarly, the central members 16 are pivotally fastened on member 13. The central member 16 is provided with means for selectively locking the length of extension of the sections 11 and 11' and 12 and 12'. Means locking may include a multiplicity of holes 21 and 22 in the respective central members 16 and 20', and a pin 23 engageable through the holes 21 and 22. Alternatively, means locking may comprise a multiplicity of rack-like teeth 24 disposed on one side of the central rail member 20 and a pawl-like catch 25 pivotally mounted on the complementary central member 16 through an aperture 16 (not shown). As shown in the FIGS. 1, 3, 4 and 5, in operation the extensible sections 12 and 12' may be selectively drawn from the panel sections 11 and 11' and locked by either of the means for locking the sections as set out above. As with the dagger 18, the means locking the sections 11 and 11 and 12 and 12 should be configured not to project sidewardly from the barrier 10.

Figure 2:
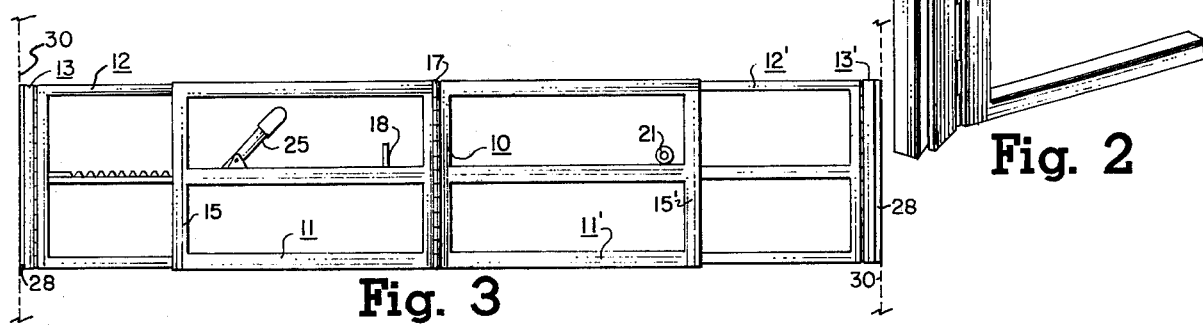
FIG. 2 is a fragmentary perspective view of a typical abutment bar and the extensible section.

Referring to the FIG. 2, each abutment bar 13 comprises an abutment channel 27 to which the members 20 and 20 are pivotally fastened and is substantially co-extensive in length with the transverse members 15 and 15, and a resilient portion 28 carried within and projecting from the channel 27. The channel 27 is fastened centrally to the transverse members 15 and 15 by a pivot 29. The pivot 29 may be selected from any of a variety of types of hinge mounts and pivots which are operable to both carry the load and to permit free rotation of the channel 27. It is to be understood that this structure permits a limited arcuate pivot of the channel 27 and the resilient portion 28 to better receive loads on the barrier and to fully conform the abutment bars 13 with walls of an enclosure (not shown). The resilient portion 28 may be fabricated of any number of elastomers.

Figure 3:
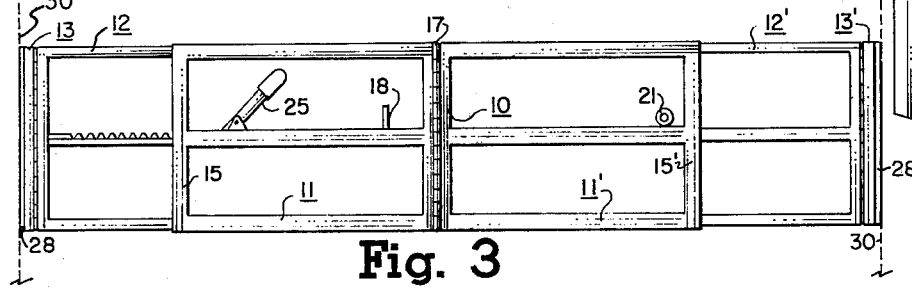
FIG. 3 is a front elevational view of the apparatus of the FIG. 1 of the barrier shown from the side opposite the FIG. 1, and shown with walls of an enclosure in broken lines for illustrative purposes.

As shown in the FIG. 3, in operation, the barrier 10 may be taken from its folded, fully telescoped structure to the operating position, by first unfolding the panels 11 and 11 to a straight configuration and engaging the dagger 18, and extending the sections 12 and 12 to fully engage and conform to the walls of an enclosure 30. It may be seen that manipulation of the sections 12 and 12 may be uneven according to conditions of manipulation. It is to be understood that means for locking the sections 11 and 11 and 12 and 12 should be at sufficiently small increments to permit the interval of compression of the resilient portions 28 to insure engagement of the barrier 10 with the enclosure 30 with sufficient force to retain a load.

Figure 4:
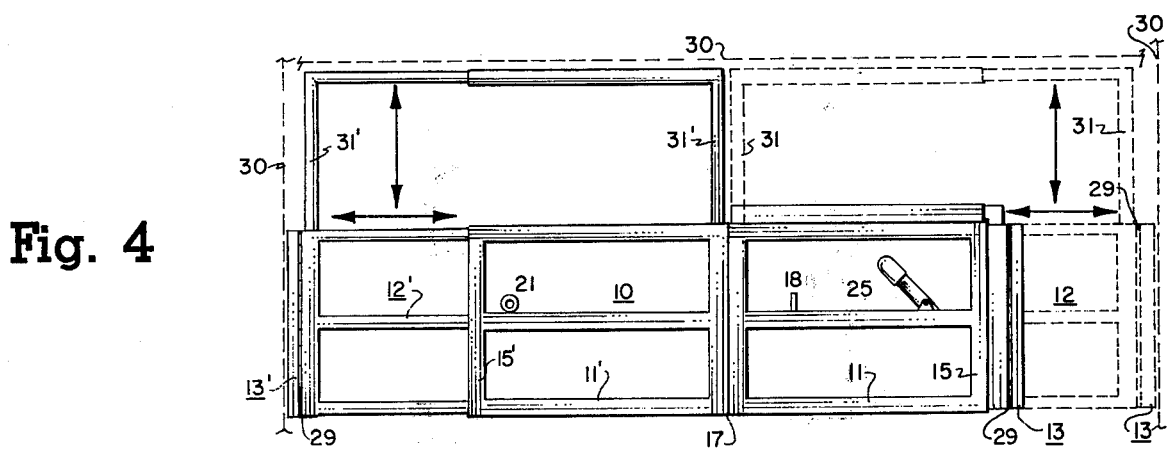
FIG. 4 is a front elevational view of a further embodiment of the present barrier configured to block more of the area of an enclosure shown in broken lines for illustrative purposes.

Referring to the FIGS. 3 and 4, it may be seen that the barrier 10 may be configured in a variety of proportions and configurations which may only nominally fill the enclosure 30 (as shown in FIG. 3) or to fill substantially all of the enclosure area (as shown in the FIG. 4). The larger barrier 10, as shown in FIG. 4, may include additional vertical lattice members 31 and 31 in sections 11 and 11 to further restrict movement of loads which may drop through the framework of the sections 11 and 11.

Figure 5:
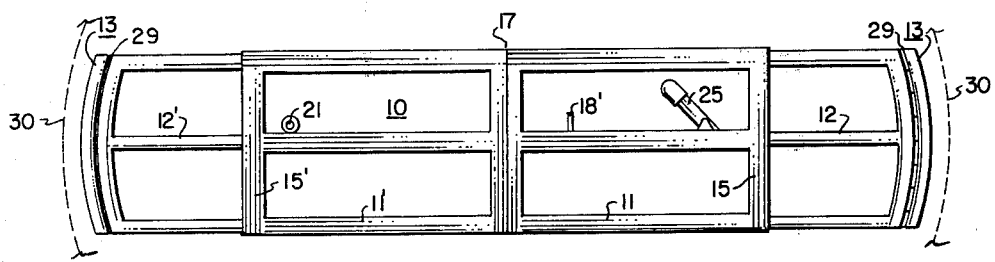
FIG. 5 is an elevational view of a still further embodiment of the present barrier shown with curved abutment bars and extensible portions for use in a curved enclosure.

Referring to the FIG. 5, a still further embodiment of the barrier 10 may include curved abutment bars 13 and 13 mounted on extensible sections 12 and 12. This embodiment is particularly well adapted to curved structures, such as tank walls, airplane fuselages, and the like. The embodiment of the FIG. 5 may be seen to employ the same channel sections 11 and 11 set out above. Means for locking the sections 11 and 11 and 12 and 12 may be of the sort set forth above. The structure of the bars 13 and 13 in the curved embodiment is substantially the same as set forth above in the linear configuration with channel 27, and resilient portion 28. Operation of the curved embodiment of the barrier 10 is identical to that set forth above.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A barrier, comprising:
   a pair of tubular panel sections including a rectangular framework having a pair of rectilinear members and end members connecting terminal ends of said rectilinear members, said panel sections being connected by a hinge connecting end members, said panel sections being selectively locked in a straight, linear configuration by a dagger which may be selectively extended through apertures in said end members and through aligned rectilinear members;
   extensible sections each having a pair of rails which may slidably telescope within said rectilinear members at their ends opposite said hinge, means selectively locking said extensible sections with said panel sections, carried on said rectilinear members and said rails thereof; and
   abutment bars fastened at the outermost terminal ends of said rails said abutment bars are pivotally fastened to said rail for restricted arcuate travel.

2. The article of claim 1 including a central member disposed centrally between said rectilinear members, said central member carrying said dagger and said means locking said panel sections and said extensible sections.

3. The article of claim 1 wherein said dagger is a L-shaped member having one of its sections carried within one of said rectilinear members and having its complementary L-shaped portion issuing through an aperture in said rectilinear member carrying said dagger.

4. The article of claim 3 including a spring mounted in said rectilinear member carrying said dagger.

5. The article of claim 1 wherein said means for locking said extensible sections with said panel sections include a multiplicity of holes in said rails and in said rectilinear member and suitable increments, and a pin engageable with said rails and said rectilinear member.

6. The article of claim 1 wherein said means for locking said panel sections and said extensible sections is a rack disposed on at least one of said extensible section rails and a pawl-like catch disposed on a complementary rectilinear member which is engageable wwith said rack.

7. The article of claim 1 wherein each of said abutment bars comprises a U-shaped channel fastened centrally to said rails on a pivot, and a resilient portion carried within and projecting from said channel.

8. The article of claim 1 wherein said abutment bars are curved and coextensive with the width dimension of said barrier.

* * * * *